(12) United States Patent
Collopy et al.

(10) Patent No.: US 12,092,038 B2
(45) Date of Patent: Sep. 17, 2024

(54) ROTOR DYNAMICS ACCOMMODATION USING ELECTRICAL POWER ASSIST

(71) Applicant: RTX Corporation, Farmington, CT (US)

(72) Inventors: Gary Collopy, Vernon, CT (US); Arthur M. Salve, Jr., Tolland, CT (US); Michael Winter, New Haven, CT (US)

(73) Assignee: RTX CORPORATION, Farmington, CT (US)

( * ) Notice: Subject to any disclaimer, the term of this patent is extended or adjusted under 35 U.S.C. 154(b) by 646 days.

(21) Appl. No.: 16/991,275

(22) Filed: Aug. 12, 2020

(65) Prior Publication Data

US 2021/0047970 A1 Feb. 18, 2021

Related U.S. Application Data

(60) Provisional application No. 62/886,202, filed on Aug. 13, 2019.

(51) Int. Cl.
*F02C 7/36* (2006.01)
*B64D 27/02* (2006.01)

(52) U.S. Cl.
CPC ............... *F02C 7/36* (2013.01); *B64D 27/02* (2013.01); *B64D 27/026* (2024.01);
(Continued)

(58) Field of Classification Search
CPC ..... F02C 6/00; F02C 7/36; F02C 9/28; B64D 27/02; B64D 2027/026; F05D 2220/323;
(Continued)

(56) References Cited

U.S. PATENT DOCUMENTS 9,631,606 B2 4/2017 Slack et al.
9,938,850 B2 4/2018 Edwards et al.
(Continued)

FOREIGN PATENT DOCUMENTS

EP 3480939 A1 5/2019
EP 3489468 A1 5/2019

OTHER PUBLICATIONS

Extended European Search Report for European Application No. 20190981.9, International Filing Date Aug. 13, 2020, Date of Mailing Jan. 12, 2021, 7 pages.

*Primary Examiner* — Jason H Duger
(74) *Attorney, Agent, or Firm* — CANTOR COLBURN LLP (57) ABSTRACT

Hybrid electric propulsion systems are described. The systems include a gas turbine engine having low and high speed spools, each spool having a respective compressor and turbine. A mechanical power transmission is configured to at least one of extract power from and supply power to at least one of the low speed spool and the high speed spool, an electric machine is configured to augment rotational power of at least one of the spools, and a controller is operable to determine a rotational speed of the low speed spool, determine a rotational speed of the high speed spool, determine if a predetermined operational zone of operation based on the determined rotational speeds is present, and when a predetermined operational zone is determined, control a power augmentation of at least one spool to limit dwell operation of the gas turbine engine within the predetermined operational zone.

20 Claims, 5 Drawing Sheets

(52) U.S. Cl.
CPC .. *F05D 2220/323* (2013.01); *F05D 2270/023* (2013.01); *F05D 2270/053* (2013.01); *F05D 2270/304* (2013.01)

(58) Field of Classification Search
CPC ........... F05D 2260/96; F05D 2270/023; F05D 2270/053; F05D 2270/304; F05D 2270/114; F02K 5/00
See application file for complete search history.

(56) References Cited

U.S. PATENT DOCUMENTS

| | | |
|---|---|---|
| 10,047,702 B2 | 8/2018 | Sabnis |
| 2008/0279675 A1* | 11/2008 | Ullyott ...................... F02C 9/46 701/100 |
| 2010/0251726 A1* | 10/2010 | Jones ........................ F02C 7/32 60/773 |
| 2016/0304211 A1* | 10/2016 | Swann ................... B64D 31/06 |
| 2019/0131902 A1* | 5/2019 | Ciciriello .............. F16C 17/028 |
| 2019/0136768 A1 | 5/2019 | Harvey |

* cited by examiner

ROTOR DYNAMICS ACCOMMODATION USING ELECTRICAL POWER ASSIST

CROSS REFERENCE TO RELATED APPLICATIONS

This application claims the benefit of an earlier filing date from U.S. Provisional Application Ser. No. 62/886,202, filed Aug. 13, 2019, the entire disclosure of which is incorporated herein by reference.

BACKGROUND

The subject matter disclosed herein generally relates to rotating machinery and, more particularly, to a method and an apparatus for operability control for hybrid electric propulsion.

Gas turbine engines typically include multiple spools with a compressor section and a turbine section on opposite sides of a combustor section in an engine core. As an example, in a two-spool design, fuel in air that has been compressed by a low pressure compressor (LPC) followed by a high pressure compressor (HPC) of the compressor section is combusted. The combustion takes place in the combustor section to create heated gases with increased pressure and density. The heated gases are used to rotate a high pressure turbine (HPT) followed by a low pressure turbine (LPT) in the turbine section that are used to produce thrust or power. Air flows through the compressor and turbine sections differ at various operating conditions of an engine, with more air flow being required at higher output levels and vice versa. Aerodynamic interaction between the LPC and HPC with respect to speed can impact compressor stability in the compressor section.

BRIEF DESCRIPTION

According to some embodiments, hybrid electric propulsion systems are provided. The hybrid electric propulsion systems may include a gas turbine engine having a low speed spool and a high speed spool. The low speed spool includes a low pressure compressor and a low pressure turbine, and the high speed spool includes a high pressure compressor and a high pressure turbine. A mechanical power transmission is configured to at least one of extract power from and supply power to at least one of the low speed spool and the high speed spool. An electric machine is configured to augment rotational power of at least one of the low speed spool and the high speed spool. A controller is operable to determine a rotational speed of the low speed spool, determine a rotational speed of the high speed spool, determine if a predetermined operational zone of operation based on the determined rotational speeds is present, and when a predetermined operational zone is determined, control a power augmentation of at least one of the low speed spool and the high speed spool to limit dwell operation of the gas turbine engine within the predetermined operational zone.

In addition to one or more of the features described above, or as an alternative, embodiments of the hybrid electric propulsion systems may include that the predetermined operational zone is based on a rotor dynamics critical speed range of at least one of the low speed spool and the high speed spool.

In addition to one or more of the features described above, or as an alternative, embodiments of the hybrid electric propulsion systems may include that the control of the power augmentation is performed to limit negative rotor dynamics during operation of the gas turbine engine.

In addition to one or more of the features described above, or as an alternative, embodiments of the hybrid electric propulsion systems may include that the control of the power augmentation includes at least one of adding or extracting power from the low speed spool while at least maintaining thrust of the gas turbine engine.

In addition to one or more of the features described above, or as an alternative, embodiments of the hybrid electric propulsion systems may include that the control of the power augmentation includes at least one of adding or extracting power from the high speed spool while at least maintaining thrust of the gas turbine engine.

In addition to one or more of the features described above, or as an alternative, embodiments of the hybrid electric propulsion systems may include that the control of the power augmentation includes transferring power from the low speed spool to the high speed spool while at least maintaining thrust of the gas turbine engine.

In addition to one or more of the features described above, or as an alternative, embodiments of the hybrid electric propulsion systems may include that the control of the power augmentation includes transferring power from the high speed spool to the low speed spool while at least maintaining thrust of the gas turbine engine.

In addition to one or more of the features described above, or as an alternative, embodiments of the hybrid electric propulsion systems may include that the control of the power augmentation includes at least one of adding or extracting power from the low speed spool during a transient mode of operation of the gas turbine engine to slow a rotor speed rate of change while at least maintaining thrust of the gas turbine engine.

In addition to one or more of the features described above, or as an alternative, embodiments of the hybrid electric propulsion systems may include that the control of the power augmentation includes at least one of adding or extracting power from the high speed spool during a transient mode of operation of the gas turbine engine to slow a rotor speed rate of change while at least maintaining thrust of the gas turbine engine.

In addition to one or more of the features described above, or as an alternative, embodiments of the hybrid electric propulsion systems may include that the control of the power augmentation includes transferring power from the low speed spool to the high speed spool during a transient mode of operation of the gas turbine engine to slow a rotor speed rate of change while at least maintaining thrust of the gas turbine engine.

In addition to one or more of the features described above, or as an alternative, embodiments of the hybrid electric propulsion systems may include that the control of the power augmentation includes transferring power from the high speed spool to the low speed spool during a transient mode of operation of the gas turbine engine to slow a rotor speed rate of change while at least maintaining thrust of the gas turbine engine.

In addition to one or more of the features described above, or as an alternative, embodiments of the hybrid electric propulsion systems may include at least one mechanical power transmission configured to extract power from the high speed spool and add power to the high speed spool.

In addition to one or more of the features described above, or as an alternative, embodiments of the hybrid electric propulsion systems may include at least one mechanical power transmission configured to extract power from the low speed spool and add power to the high speed spool.

According to some embodiments, methods for controlling hybrid electric propulsion systems are provided. The methods may include monitoring, by a controller, a mode of operation of a gas turbine engine is occurring, the gas turbine engine having a low speed spool and a high speed spool, the low speed spool having a low pressure compressor and a low pressure turbine, and the high speed spool having a high pressure compressor and a high pressure turbine, determining, by the controller, a rotational speed of the low speed spool, determining, by the controller, a rotational speed of the high speed spool, determining, by the controller, if a predetermined operational zone of operation is present based on the determined rotational speeds, and controlling, by the controller, a power augmentation of at least one of the low speed spool and the high speed spool to limit dwell operation of the gas turbine engine within the predetermined operational zone.

In addition to one or more of the features described above, or as an alternative, embodiments of the methods may include that the predetermined operational zone is based on a rotor dynamics critical speed range of at least one of the low speed spool and the high speed spool.

In addition to one or more of the features described above, or as an alternative, embodiments of the methods may include that the control of the power augmentation is performed to limit negative rotor dynamics during operation of the gas turbine engine.

In addition to one or more of the features described above, or as an alternative, embodiments of the methods may include that, at least one of: the control of the power augmentation includes at least one of adding or extracting power from the low speed spool at least maintaining thrust of the gas turbine engine; and the control of the power augmentation includes at least one of adding or extracting power from the high speed spool while at least maintaining thrust of the gas turbine engine.

In addition to one or more of the features described above, or as an alternative, embodiments of the methods may include that, at least one of: the control of the power augmentation includes transferring power from the low speed spool to the high speed spool while at least maintaining thrust of the gas turbine engine; and the control of the power augmentation includes transferring power from the high speed spool to the low speed spool while at least maintaining thrust of the gas turbine engine.

In addition to one or more of the features described above, or as an alternative, embodiments of the methods may include that, at least one of: the control of the power augmentation includes at least one of adding or extracting power from the low speed spool during a transient mode of operation of the gas turbine engine to slow a rotor speed rate of change while at least maintaining thrust of the gas turbine engine; and the control of the power augmentation includes at least one of adding or extracting power from the high speed spool during a transient mode of operation of the gas turbine engine to slow a rotor speed rate of change while at least maintaining thrust of the gas turbine engine.

In addition to one or more of the features described above, or as an alternative, embodiments of the methods may include that, at least one of: the control of the power augmentation includes transferring power from the low speed spool to the high speed spool during a transient mode of operation of the gas turbine engine to slow a rotor speed rate of change while at least maintaining thrust of the gas turbine engine; and the control of the power augmentation includes transferring power from the high speed spool to the low speed spool during a transient mode of operation of the gas turbine engine to slow a rotor speed rate of change while at least maintaining thrust of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
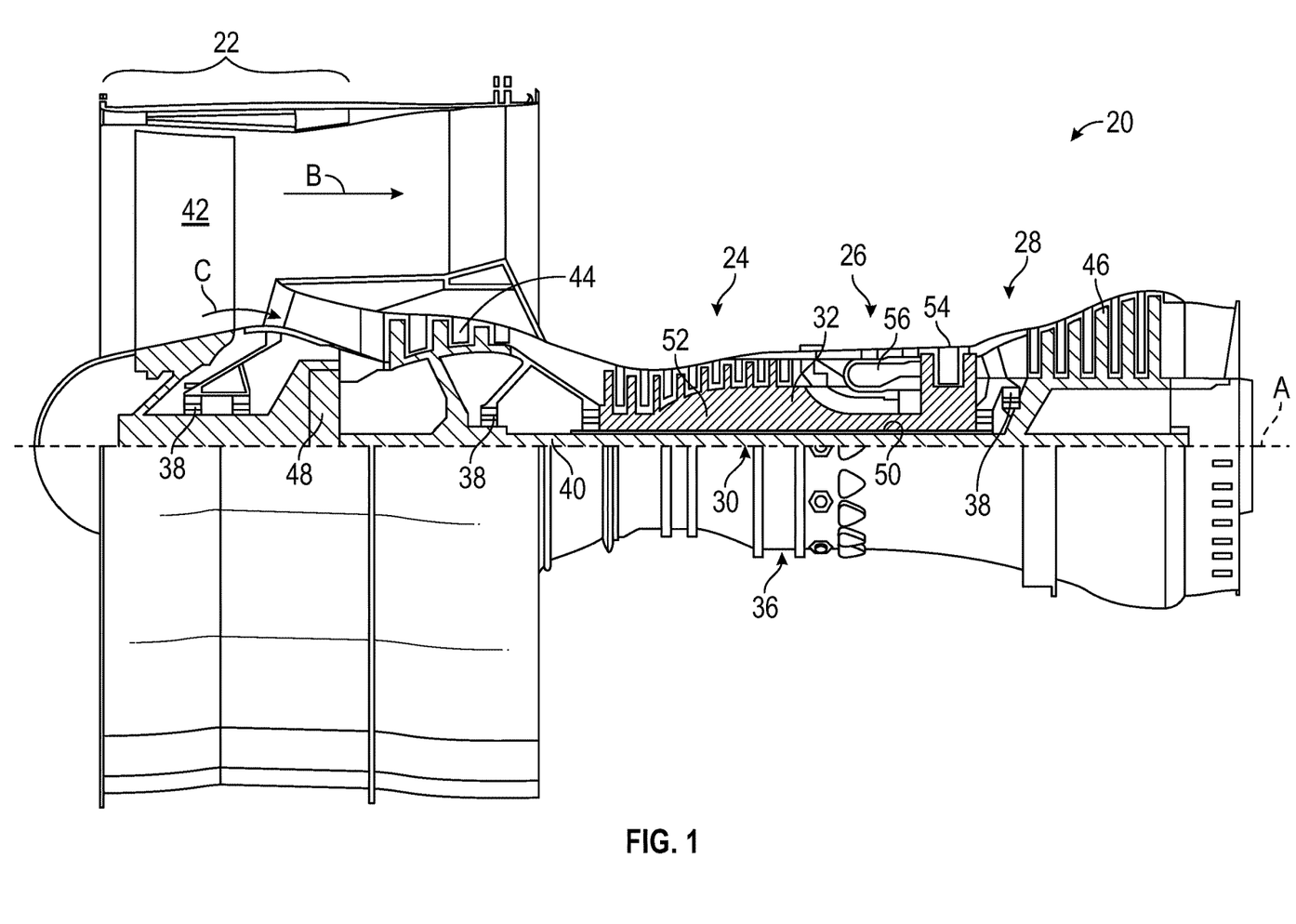
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The illustrative gas turbine engine 20, as shown, includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the bearing systems 38 may be varied as appropriate to the application.

The low speed spool 30 generally includes an inner shaft 40 that interconnects a fan 42 of the fan section 22, a low pressure compressor 44, and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via the bearing systems 38 about the engine central longitudinal axis A which is collinear with a longitudinal axis thereof.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, the compressor section 24, the combustor section 26, the turbine section 28, and the fan drive gear system 48 may be varied. For example, in some configurations, the gear system 48 may be located aft of the combustor section 26 or even aft of the turbine section 28, and the fan section 22 may be positioned forward or aft of the location of the gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the bypass ratio of the gas turbine engine 20 is greater than about ten (10:1), the fan diameter is significantly larger than that of the low pressure compressor 44, and the low pressure turbine 46 has a pressure ratio that is greater than about five 5:1. A pressure ratio of the low pressure turbine 46 is a pressure measured prior to inlet of the low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

While the example of FIG. 1 illustrates one configuration of a gas turbine engine, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
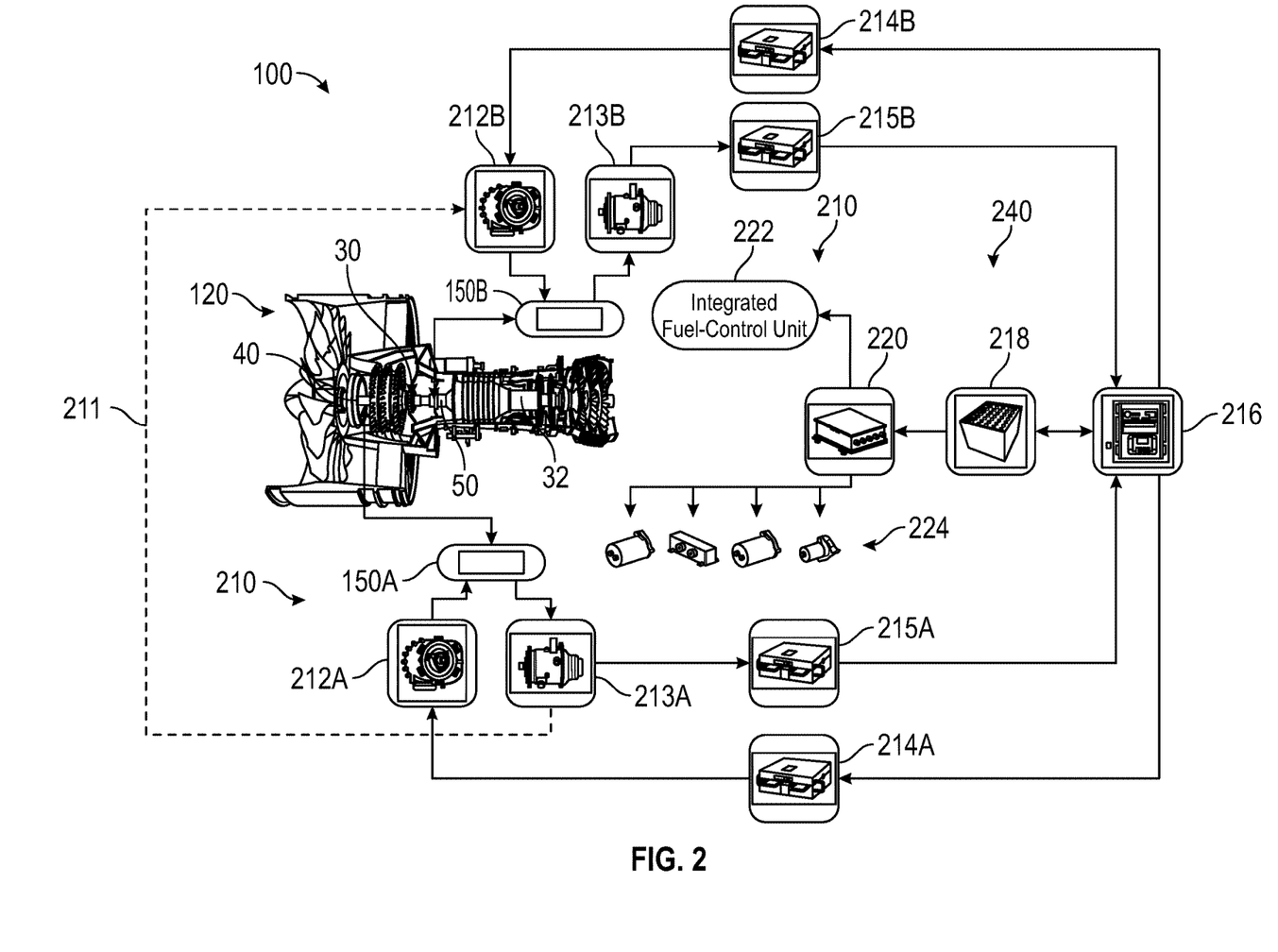
FIG. 2 is a schematic diagram of a hybrid electric propulsion system with physical power flow connections (electrical and mechanical power), in accordance with an embodiment of the disclosure.

FIG. 2 illustrates a hybrid electric propulsion system 100 (also referred to as hybrid gas turbine engine 100) including a gas turbine engine 120 operably coupled to an electrical power system 210 as part of a hybrid electric aircraft. One or more mechanical power transmissions 150A, 150B can be operably coupled between the gas turbine engine 120 and the electrical power system 210. The gas turbine engine 120 can be arranged and/or configured as shown in FIG. 1. In FIG. 2, the gas turbine engine 120 includes one or more spools, such as a low speed spool 30 and a high speed spool 32, each with at least one compressor section and at least one turbine section operably coupled to a shaft (e.g., a low pressure compressor and low pressure turbine coupled to an inner shaft 40 and a high pressure compressor and a high pressure turbine coupled to an outer shaft 50).

The electrical power system 210 can include one or more electric machines, which may include motors, generators, etc. As shown, the electrical power system 210 includes a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212A) or additional electric motors. The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B are depicted in FIG. 2, it will be understood that there may be only a single electric generator (e.g., only electric generator 213A) or additional electric generators. In some embodiments, one or more of the electric motors 212A, 212B can be configured as a motor or a generator depending upon an operational mode or system configuration, and thus one or more of the electric generators 213A, 213B may be omitted.

In the example of FIG. 2, a first mechanical power transmission 150A includes a gearbox operably coupled between the inner shaft 40 and a combination of the first electric motor 212A and the first electric generator 213A. A second mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between the energy storage system 218 and the electronics 214A, 214B, 215A, 215B of the electrical power system 210. The energy storage system 218 can include one or more energy storage devices, such as one or more batteries, super capacitors, ultra-capacitors, and the like. The energy storage management system 216 can facilitate various power transfers within the hybrid electric propulsion system 100. For example, power from the first electric generator 213A can be transferred (illustrated at 211) to the second electric motor 212B as a low speed spool-to-high speed spool power transfer. Other examples of power transfers may include a power transfer from the second electric generator 213B to the first electric motor 212A as a high speed spool-to-low speed spool power transfer.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a plurality of actuators 224 to operationally control and/or power transfer between the low speed spool 30 and the high speed spool 32. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, actuators 224 and/or other elements.

Figure 3:
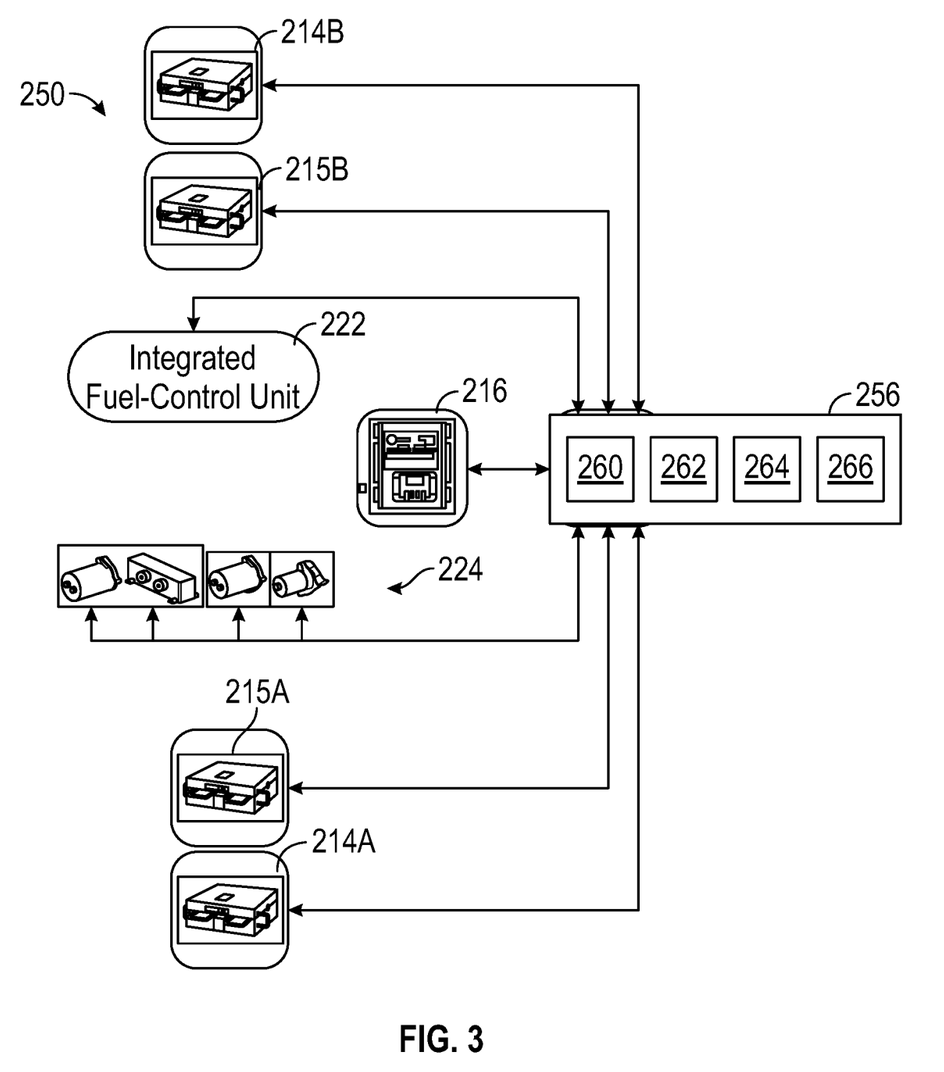
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2. A controller 256 can interface with the motor drive electronics 214A, 214B, the rectifier electronics 215A, 215B, the energy storage management system 216, the integrated fuel control unit 222, the actuators 224, and/or other components of the hybrid electric propulsion system 100. In some embodiments, the controller 256 can control and monitor for operating conditions of the gas turbine engine 120 and/or the electrical power system 210, such as related to operational speed or rotational speeds of the low speed spool 30 and the high speed spool 32 (e.g., predetermined operational zones). For example, the controller 256 can be integrally formed or otherwise in communication with a full authority digital engine control (FADEC) of the gas turbine engine 120. In some embodiments, the controller 256 can include a processing system 260, a memory system 262, and an input/output interface 264. The controller 256 can also include various operational controls, such as, for example, a power transfer control 266 that is configured to control the hybrid electric system control effectors 240 (e.g., actuators 224). In some configurations, as shown, the power transfer control 266 may be integrated or part of the controller 256. In other embodiments, power transfer control may be performed or achieved using a component that is separate from the controller 256.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In some embodiments, the memory system 262 may include random access memory (RAM), read only memory (ROM), and/or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, the rectifier electronics 215A, 215B, the energy storage management system 216, the integrated fuel control unit 222, the actuators 224, and/or other components of the hybrid electric propulsion system 100. The controller 256 provides a means for controlling the hybrid electric system control effectors 240 based on a power transfer control 266 that is dynamically updated during operation of the hybrid electric propulsion system 100. The means for controlling the hybrid electric system control effectors 240 can be otherwise subdivided, distributed, or combined with other control elements. One form of such control may be to transfer power (e.g., rotational speed) from one spool to another spool using the actuators 224 or other effectors 240.

The power transfer control 266 can apply control laws and access/update models to determine how to control and transfer power to and from the hybrid electric system control effectors 240. For example, sensed and/or derived parameters related to speed, rotational speed, flow rate, pressure ratios, temperature, thrust, and the like can be used to establish operational schedules and transition limits to maintain efficient operation of the gas turbine engine 120. In some embodiments, the determination can include, for example, onboard processing of data related to rotational speeds or other input data within the controller 256. In some embodiments, the determination may be or include receiving information as a signal or communication from an external source at the controller 256 (e.g., from components of the motor drive electronics 214A, 214B, the rectifier electronics 215A, 215B, and/or the energy storage management system 216).

In one example embodiment, the power transfer control 266 can control a power transfer between the first electric generator 213A of the low speed spool 30 and the second electric motor 212B of the high speed spool 32 to adjust a current operating condition of the gas turbine engine 120 based on a target operating condition. Such target operation condition can include avoidance of pre-defined predetermined operational zones of operation (e.g., specific rotational speeds that are typically avoided during operation). The power transfer from the low speed spool 30 to the high speed spool 32 shifts the relationship between the speed of the low speed spool 30 and the high speed spool 32 while the power transfer is active. This results in the same speed (e.g., N1) of the low speed spool 30 with a higher speed (e.g., N2) of the high speed spool 32 based on the power transfer.

Typically, gas turbine engines have mechanical damping design features that reduce both high and low spool rotor natural frequency response in the normal operating speed ranges of the engine so that commanded thrust can be achieved at any point in the operating envelope. The thrust produced is a function of rotor speed, temperature, and fuel flow at various altitudes and flight speeds.

The addition or reduction of rotor speeds by adding of removing power from either or both engine spools mechanically through a motor/generator driven by means of a battery, or electrical power transfer between spools, allows thrust to be maintained at a different thermodynamic match points, thereby moving a rotor resonance point while maintaining the commanded thrust. That is, the power transfer control can provide a shifting of power to or from one or both of the spools in a two-spool system to avoid specific pre-defined rotational speed that may result in rotor dynamics that are adverse to engine operation.

The power transfer control and/or the processing system described above are configured to optimize rotor dynamics. Such optimization of operation, and specifically the avoidance of undesirable rotational speeds can eliminate typical systems used in engines (e.g., dampeners, etc. that are typically used to absorb rotor dynamic effects). As used herein "rotor dynamics" refers to rotational mechanics of engine rotor systems. Rotor dynamics management of rotating parts in an engine ensures mechanical vibration stays within limits. At critical speeds, resonant characteristics of the rotor can intensify the rotational behavior and rotor deflections, which requires abatement by damping mechanisms or avoiding dwell operation near those critical speeds. Dwell refers to a steady rotor speed, maintaining a constant speed over a period of time (e.g., at least 30 second to several hours).

Figure 4:
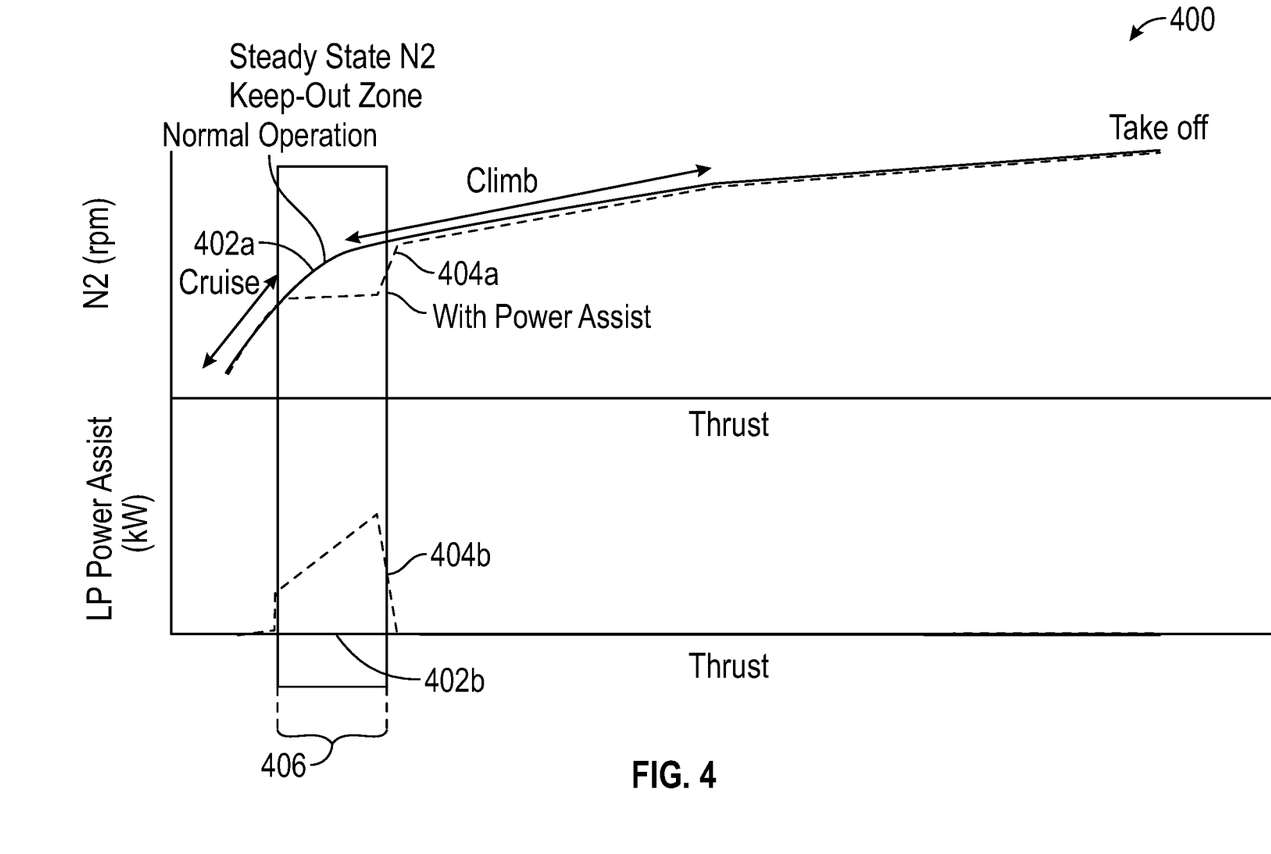
FIG. 4 is a plot that graphically illustrates a relationship between compressor pressure and compressor air flow in a gas turbine engine, in accordance with an embodiment of the disclosure.

Turning now to FIG. 4, for example, a thrust plot 400 is shown for various operating conditions, including takeoff, climb, and cruise, for an aircraft. In FIG. 4, the horizontal axis represents arbitrary thrust values (with highest thrust required at takeoff). The top portion of plot 400 represents the rotational speed of the engine core or high speed spool. The bottom portion of plot 400 represents a low speed spool power assist applied to the low speed spool. In plot 400, the lines 402a, 402b represents a traditional thrust plot (e.g., normal operation without embodiments of the present disclosure). In contrast, lines 404a, 404b represent a thrust plot of engine operation employing an embodiment of the present disclosure. Further, in plot 400, a predetermined operational zone 406 is shown. The predetermined operational zone 406 is a region or range or thrust operational states where, for example, normal operation presents undesirable rotor speeds due to a negative rotor dynamic condition. Negative rotor dynamic conditions can include, for example and without limitation, operation at rotor resonant frequencies, operation with mechanical vibrations beyond predetermined limits of operation, and/or rotor deflections beyond predetermined limits of operation. Because of this, the predetermined operational zone 406 is typically avoided or prevented by an engine control. However, embodiments of the present disclosure are directed to, in part, allow commanded thrush while minimizing or limiting operation in the predetermined operational zones. As used herein, the term "predetermined operational zone" means an engine rotor speed range where the engine bypasses quickly to avoid excessive rotor imbalance (e.g., avoid negative rotor dynamics).

A continuous thrust climb may be achieved by employing embodiments of the present disclosure. Specifically, as shown in the bottom portion of plot 400, a low speed spool power assist may be provided (line 404b) during or within the typical predetermined operational zone 406. The rotational speed of the high speed spool may be adjusted such that the bending moments of the high speed spool and the low speed spool are not integer multiples (e.g., resonant frequencies), and thus the negative rotor dynamics may be avoided. Accordingly, the throttle does not need to be limited, and a pilot/operator may be able to demand continuous thrust from the engine.

Figure 5A:
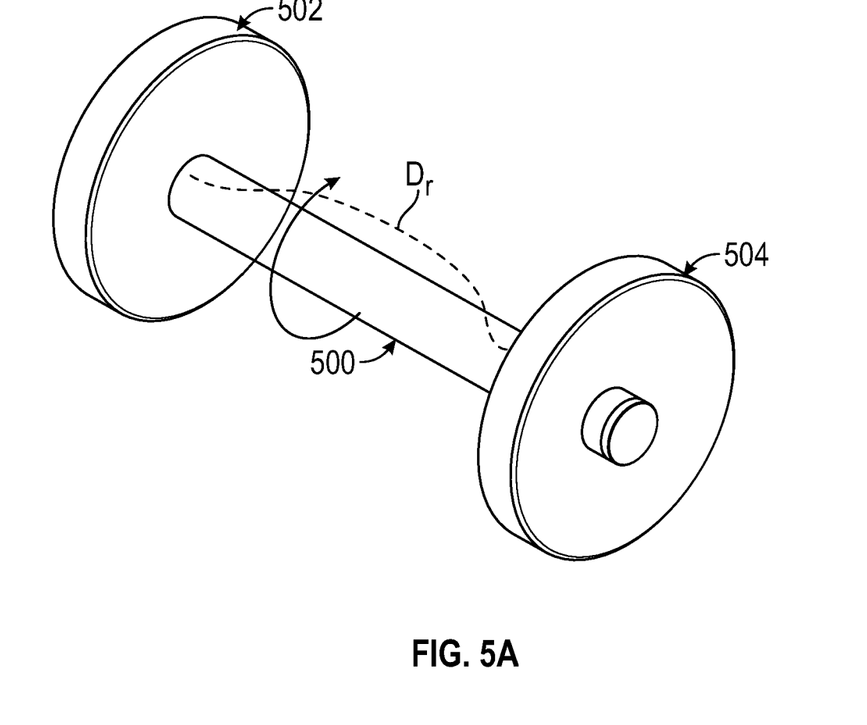
FIG. 5A is an isometric schematic illustration of a spool that may be subject to negative rotor dynamics.
Figure 5B:
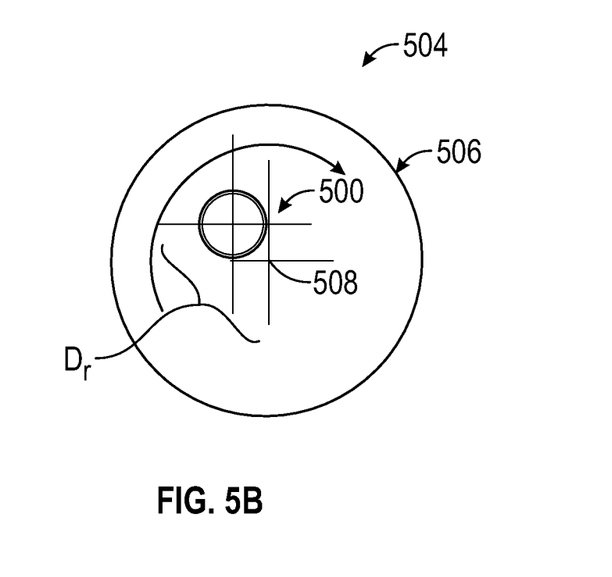
FIG. 5B is an axial illustration of the spool of FIG. 5A.

Turning now to FIGS. 5A-5B, schematic illustrations of an engine spool 500, which can either be the low speed spool or the high speed spool, locked by bearings 502, 504 on each end is shown. FIG. 5A is an isometric illustration of the engine spool 500 and FIG. 5B is an axial (end-on) illustration of the spool 500. In the axial view shown in FIG. 5B, the spool 500, where it is not locked by bearings, spins within a case 506, although asymmetrically compared to a case center 508. The asymmetric rotation of the spool 500 can cause radial deflection Dr where the spool 500 rotates free between the two bearings 502, 504. External forces and mechanical resonance can exaggerate the non-concentric deflection Dr. Damping mechanisms can reduce the imbalance.

The transfer of power from one spool to another (or the extraction or addition of power to a spool) to achieve a desired effect is provided in accordance with embodiments of the present disclosure. In some embodiments, a clutch configuration or other mechanical power transmission configuration, as described above, may be arranged to extract rotational energy from at least one of the high speed spool and/or the low speed spool and/or add rotational energy to at least one of the high speed spool and/or the low speed spool. By removing or adding power (e.g., rotational energy) from a spool, the resonance or bending modes between the two spools may be controlled. As such, specific rotational speeds or relative rotational speeds (e.g., ratios of speeds) may be avoided (e.g., integer multiples of bending moments of the spools).

Embodiments of the present disclosure may provide for various power transmission, power extraction, and/or power addition, to one or more spools of a gas turbine engine. For example, low speed spool power addition or extraction may be performed to limit, avoid, or prevent dwell at high rotor speed (N2) range while maintaining commanded thrust. Further, as another example, high speed spool power addition or extraction may be performed to limit, avoid, or prevent dwell at high rotor speed (N2) range while maintaining commanded thrust. As another example, low speed spool-to-high speed spool power transfer or high speed spool-to-low speed spool power transfer may be performed to limit, avoid, or prevent dwell at high rotor speed (N2) range while maintaining commanded thrust. Furthermore, for example, power addition or extraction on either spool during a transient operational condition (e.g., takeoff, climb, descent) may be performed to slow N2 rate of change and relieve resonance while maintaining commanded thrust.

The terms "about" and "substantially" are intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "includes" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system comprising:
    a gas turbine engine comprising a low speed spool and a high speed spool, the low speed spool comprising a low pressure compressor and a low pressure turbine, and the high speed spool comprising a high pressure compressor and a high pressure turbine, wherein a fan section is rotationally driven by the low speed spool;
    a mechanical power transmission configured to at least one of extract power from and supply power to at least one of the low speed spool and the high speed spool;
    an electric machine operably connected to the high speed spool and the low speed spool via the mechanical power transmission and configured to augment rotational power of at least one of the low speed spool and the high speed spool; and
    a controller operable to:
        receive an input representative of a commanded thrust of the hybrid electric propulsion system;
        operate the electric machine such that power of at least one of the low speed spool and the high speed spool is increased or decreased by the electric machine in order to provide the commanded thrust;
        determine a rotational speed of the low speed spool;
        determine a rotational speed of the high speed spool;
        determine if a predetermined operational zone of operation based on the determined rotational speeds is present, wherein the predetermined operational zone includes a resonance point of the hybrid electric propulsion system; and
        when the predetermined operational zone is determined to be present, control a power augmentation of at least one of the low speed spool and the high speed spool to move the resonance point and limit dwell operation of the gas turbine engine within the predetermined operational zone in order to achieve the commanded thrust, and wherein a bending moment of the high speed spool is not an integer multiple of a bending moment of the low speed spool as a result of the control of the power augmentation.

2. The hybrid electric propulsion system of claim 1, wherein the predetermined operational zone is based on a rotor dynamics critical speed range of at least one of the low speed spool and the high speed spool.

3. The hybrid electric propulsion system of claim 1, wherein the control of the power augmentation is performed to limit negative rotor dynamics during operation of the gas turbine engine.

4. The hybrid electric propulsion system of claim 1, wherein the control of the power augmentation includes at least one of adding or extracting power from the low speed spool while at least maintaining thrust of the gas turbine engine.

5. The hybrid electric propulsion system of claim 1, wherein the control of the power augmentation includes at least one of adding or extracting power from the high speed spool while at least maintaining thrust of the gas turbine engine.

6. The hybrid electric propulsion system of claim 1, wherein the control of the power augmentation includes transferring power from the low speed spool to the high speed spool while at least maintaining thrust of the gas turbine engine.

7. The hybrid electric propulsion system of claim 1, wherein the control of the power augmentation includes transferring power from the high speed spool to the low speed spool while at least maintaining thrust of the gas turbine engine.

8. The hybrid electric propulsion system of claim 1, wherein the control of the power augmentation includes at least one of adding or extracting power from the low speed spool during a transient mode of operation of the gas turbine engine to slow a rotor speed rate of change while at least maintaining thrust of the gas turbine engine.

9. The hybrid electric propulsion system of claim 1, wherein the control of the power augmentation includes at least one of adding or extracting power from the high speed spool during a transient mode of operation of the gas turbine engine to slow a rotor speed rate of change while at least maintaining thrust of the gas turbine engine.

10. The hybrid electric propulsion system of claim 1, wherein the control of the power augmentation includes transferring power from the low speed spool to the high speed spool during a transient mode of operation of the gas turbine engine to slow a rotor speed rate of change while at least maintaining thrust of the gas turbine engine.

11. The hybrid electric propulsion system of claim 1, wherein the control of the power augmentation includes transferring power from the high speed spool to the low speed spool during a transient mode of operation of the gas turbine engine to slow a rotor speed rate of change while at least maintaining thrust of the gas turbine engine.

12. The hybrid electric propulsion system of claim 1, wherein the mechanical power transmission is configured to extract power from the high speed spool and add power to the high speed spool.

13. The hybrid electric propulsion system of claim 1, wherein the mechanical power transmission is configured to extract power from the low speed spool and add power to the high speed spool.

14. A method for controlling a hybrid electric propulsion system, the method comprising:
    monitoring, by a controller, a mode of operation of a gas turbine engine is occurring, the gas turbine engine comprising a low speed spool and a high speed spool, the low speed spool comprising a low pressure compressor and a low pressure turbine, and the high speed spool comprising a high pressure compressor and a high pressure turbine, wherein a fan section is rotationally driven by the low speed spool;
    receiving an input representative of a commanded thrust of the hybrid electric propulsion system;
    operating an electric machine such that power of at least one of the low speed spool and the high speed spool is increased or decreased by the electric machine in order to provide the commanded thrust, wherein the electric machine is operably connected to the high speed spool and the low speed spool via a mechanical power transmission;

determining, by the controller, a rotational speed of the low speed spool;

determining, by the controller, a rotational speed of the high speed spool;

determining, by the controller, if a predetermined operational zone of operation is present based on the determined rotational speeds, wherein the predetermined operational zone includes a resonance point of the hybrid electric propulsion system; and controlling, by the controller, a power augmentation of at least one of the low speed spool and the high speed spool to move the resonance point and limit dwell operation of the gas turbine engine within the predetermined operational zone in order to achieve the commanded thrust, and wherein a bending moment of the high speed spool is not an integer multiple of a bending moment of the low speed spool as a result of the control of the power augmentation.

15. The method of claim 14, wherein the predetermined operational zone is based on a rotor dynamics critical speed range of at least one of the low speed spool and the high speed spool.

16. The method of claim 14, wherein the control of the power augmentation is performed to limit negative rotor dynamics during operation of the gas turbine engine.

17. The method of claim 14, wherein, at least one of:
the control of the power augmentation includes at least one of adding or extracting power from the low speed spool while at least maintaining thrust of the gas turbine engine; and
the control of the power augmentation includes at least one of adding or extracting power from the high speed spool while at least maintaining thrust of the gas turbine engine.

18. The method of claim 14, wherein, at least one of:
the control of the power augmentation includes transferring power from the low speed spool to the high speed spool while at least maintaining thrust of the gas turbine engine; and
the control of the power augmentation includes transferring power from the high speed spool to the low speed spool while at least maintaining thrust of the gas turbine engine.

19. The method of claim 14, wherein, at least one of:
the control of the power augmentation includes at least one of adding or extracting power from the low speed spool during a transient mode of operation of the gas turbine engine to slow a rotor speed rate of change while at least maintaining thrust of the gas turbine engine; and
the control of the power augmentation includes at least one of adding or extracting power from the high speed spool during a transient mode of operation of the gas turbine engine to slow a rotor speed rate of change while at least maintaining thrust of the gas turbine engine.

20. The method system of claim 14, wherein, at least one of:
the control of the power augmentation includes transferring power from the low speed spool to the high speed spool during a transient mode of operation of the gas turbine engine to slow a rotor speed rate of change while at least maintaining thrust of the gas turbine engine; and
the control of the power augmentation includes transferring power from the high speed spool to the low speed spool during a transient mode of operation of the gas turbine engine to slow a rotor speed rate of change while at least maintaining thrust of the gas turbine engine.

* * * * *